March 24, 1964  F. S. EIKELBERNER  3,126,207
PACKING BLOCK
Filed March 15, 1962
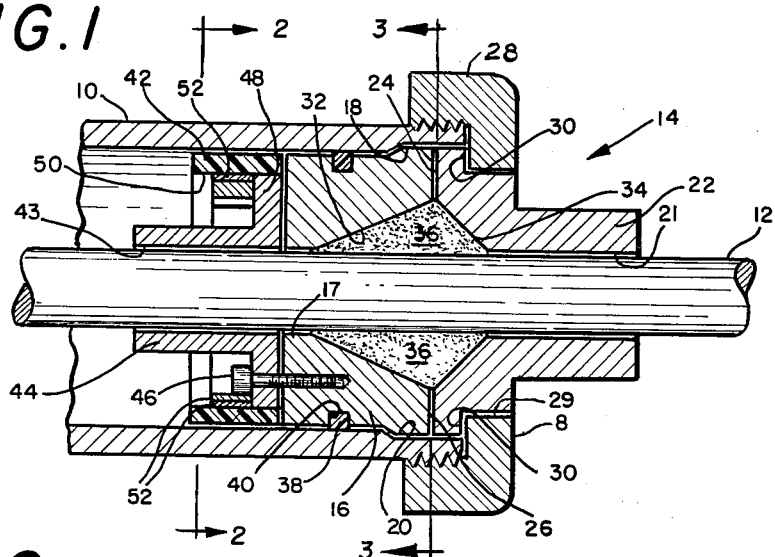
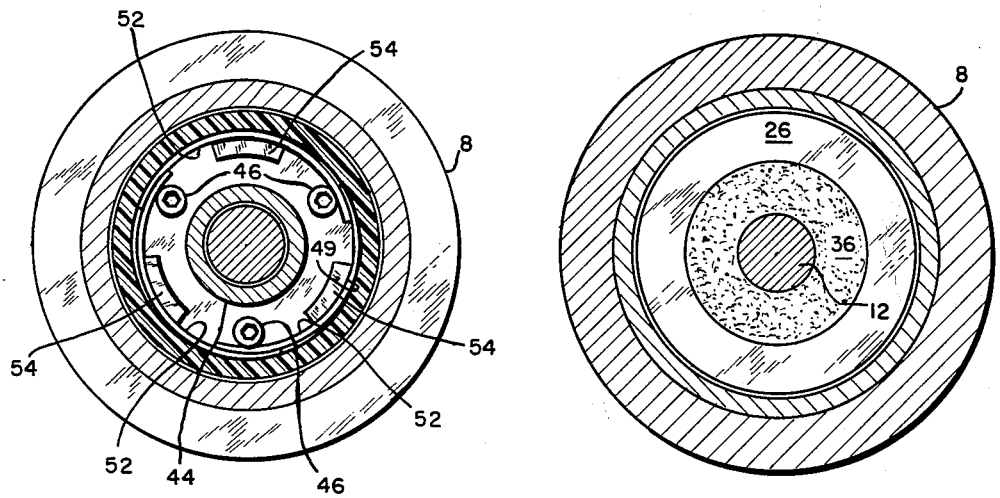
INVENTOR.
Fred S. Eikelberner
BY John R. Nesbitt
Attorney

United States Patent Office 3,126,207
Patented Mar. 24, 1964

3,126,207
PACKING BLOCK
Fred S. Eikelberner, R.F.D. 1, Logansport, Ind.; Verna L. Eikelberner, sole heir of Fred S. Eikelberner, deceased
Filed Mar. 15, 1962, Ser. No. 179,997
2 Claims. (Cl. 277—64)

This invention relates to a sealing assembly for use in maintaining a pressure seal between a pressure vessel and a piston rod reciprocating therein and passing through said sealing assembly.

The object of this invention is to provide a pressure sealing assembly which holds higher pressures between a pressure vessel and a piston rod reciprocable therein than similar sealing devices currently available.

Another object is to reduce sealing assembly maintenance such as frequent repacking.

These objects are accomplished by providing a conical well in communication with the bore through the packing nuts used in this assembly. This conical well construction increases the surface area of contact between the piston rod passing through the bores of said packing nuts and the packing material and thereby provides a better seal. The well construction further allows use of a larger volume of packing material than commonly used which permits a weak seal to be improved by tightening one packing nut toward the other for a longer period of time than is the case with conventional packing nut constructions in which the smaller volume of packing material contained between the flat opposed sealing faces of the packing nuts is soon used up.

Other objects and advantages will be pointed out in, or be apparent from, the specification and claims, as will obvious modifications of the single embodiment shown in the drawings in which:

FIG. 1 is a side sectional view of the sealing assembly;
FIG. 2 is an end view taken on line 2—2 in FIG. 1; and
FIG. 3 is a sectional view taken on line 3—3 in FIG. 1.

Referring to the drawings, a pressure cylinder 10 has a piston rod 12 reciprocable therein and said rod passes through a pressure sealing assembly 14.

Assembly 14 consists of a first member 16 which fits inside the pressure cylinder and has an annular shoulder 18 thereon which mates with annular groove 20 in the inside end of the pressure cylinder. Assembly 14 further comprises a second member 22 which has a flat end face 24 that fits against the flat end face 26 of member 16. Said members 16 and 22 have aligned bores 17 and 21, respectively, sized to permit reciprocable movement of piston rod 12 through said bores. A pressure cap 28 is internally threaded and one end of cylinder 10 is externally threaded so that cap 28 can be screwed thereon. Cap 28 has a circular aperture 29 therein through which a portion of member 22 projects and piston rod 12 passes. Member 22 has a shoulder 30 which butts against the inside of cap 28 so that by tightening cap 28 member 22 is pressed toward member 16. Of course, member 16 cannot move because of the cooperation of annular shoulder 18 and cylinder groove 20 so that the faces 26 and 24 of members 16 and 22, respectively, are pressed tightly together.

Pressure sealing assemblies currently in use employ packing material between the flat faces of members similar to members 16 and 22 and depend on such packing to be forced down against the piston rod and maintain a seal. In the present invention, a conical well 32 surrounds bore 17 through member 16 in which rod 12 is reciprocable. Another conical well 34 surrounds bore 21 through member 22 and these wells are filled with packing material 36. When cap 28 is tightened, member 22 is forced toward member 16 and the packing is forced to the left (as shown in FIG. 1) and against a large surface area of the piston rod. With this construction a pressure of 2000 p.s.i. has been successfully sealed within cylinder 10 with rod 12 being in reciprocable operation.

This excellent seal is attained largely because the present construction greatly increases the sealing area between piston and packing material over the aforementioned conventional construction in which the seal is attained by the packing being forced vertically against the piston rod by tightening two members together.

Using the present construction, frequent repacking of the sealing assembly is not required since the desired pressure seal is maintained by tightening cap 28 whenever the seal begins to lose effectiveness. As packing material is used up, the relatively large amount of material in wells 32 and 34 is forced down against rod 12 to replace the material used by merely tightening cap 28. Hence the present packing nut needs repacking much less frequently than conventional constructions thereby reducing maintenance cost.

The packing assembly illustrated also includes a sealing assembly to make a seal between the cylinder wall and said members. To accomplish this a resilient ring 38 is seated in a groove 40 in member 16 and a rubber bushing 42 is forced by a spring assembly (described below) outward against the cylinder wall. Bushing 42 surrounds a hub 44 having a bore 43 through which piston rod 12 passes. Hub 44 is held to member 16 by screws 46. Hub 44 has a skirt portion 48 around which a portion of bushing 42 fits. The remaining portion of bushing 42 has its inside surface 50 pressed outward by three identical overlapping leaf springs 52. These springs are captured between shoulders 54 and the inside surface 50 of bushing 42 with the ends of the springs overlapping so that one end of each spring bears on bushing 42 and the other end of each spring bears on the end of another leaf spring. Shoulders 54 are cast into hub 44 so that the outer surface 49 of each shoulder bears against a leaf spring and flexes it.

This construction employing spring loaded sealing bushing 42 supplements the seal made by resilient ring 38 and is very helpful in the present environment in which high sealing pressures are possible because of the conical sealing chambers described above.

Although only one embodiment of the present invention has been illustrated and described it will be apparent to those skilled in the art that various changes and modifications may be made therein without departing from the spirit of the invention or from the scope of the appended claims.

I claim:
1. In a packing nut assembly, a sealing unit comprising:
   a member having a hub portion with an annular skirt extending outwardly therefrom;
   a resilient bushing having a portion snugly fitting over the periphery of said annular skirt;
   another portion of said bushing extending around and being spaced from said hub;
   a plurality of shoulders extending from said skirt into the space bounded by said another portion of said bushing and said hub with said shoulders being spaced from said bushing;
   a plurality of leaf springs captured between said shoulders and bushing so that said springs are flexed and exert an outwardly expansive force on said bushing to provide a seal with a cylinder wherein said sealing unit is placed.
2. A packing nut assembly including:
   a pressure cylinder;
   a first member positioned in one end of said cylinder having a bore therein and being fixed with respect to said cylinder;
a flat sealing face on said first member;
a tapered well in said first member in communication with said bore and being tapered from said bore outward toward said sealing face;
a second member having a bore therein;
a portion of said second member extending inside said cylinder;
said second member having a face opposed to said flat sealing face;
a means for moving said second member toward said first member whereby packing material placed in said well is compressed toward said bore;
said packing nut assembly further including a sealing unit connected to one of said members and comprising:
a member having a hub portion with an annular skirt extending outwardly therefrom;
a resilient bushing having a portion snugly fitting over the periphery of said annular skirt;
another portion of said bushing extending around and being spaced from said hub;
a plurality of shoulders extending from said skirt into the space bounded by said another portion of said bushing and said hub with said shoulders being spaced from said bushing; and
a plurality of leaf springs captured between said shoulders and bushing so that said springs are flexed and exert an outwardly expansive force on said bushing to provide a seal between said cylinder and said one of said members.

References Cited in the file of this patent
UNITED STATES PATENTS
3,040,120    Berry _____ June 19, 1962